(12) United States Patent
Gutierrez

(10) Patent No.: US 6,182,836 B1
(45) Date of Patent: Feb. 6, 2001

(54) MOVABLE BICYCLE STORAGE RACK

(76) Inventor: Raul E. Gutierrez, 80 Long Ct., Thousand Oaks, CA (US) 91360

( * ) Notice: Under 35 U.S.C. 154(b), the term of this patent shall be extended for 0 days.

(21) Appl. No.: 09/347,655

(22) Filed: Jul. 6, 1999

Related U.S. Application Data

(63) Continuation-in-part of application No. 09/116,324, filed on Jul. 15, 1998, now abandoned.

(51) Int. Cl.[7] .................................................. A47F 7/04
(52) U.S. Cl. .............................................. 211/22; 211/24
(58) Field of Search ............................ 211/22, 205, 201, 211/21, 204, 18, 19, 23, 24, 208, 17, 175, 45, 33

(56) References Cited

U.S. PATENT DOCUMENTS

| D. 391,706 | * | 3/1998 | Malcolm | 211/205 X |
|---|---|---|---|---|
| 491,358 | * | 2/1893 | Kaufman | 211/45 X |
| 661,645 | * | 11/1900 | Rogers | 211/175 |
| 706,718 | * | 8/1902 | Bradbury | 211/20 |
| 717,157 | * | 12/1902 | Blandin | 211/175 |
| 1,272,175 | * | 7/1918 | Albright | 211/175 |
| 2,156,862 | * | 5/1939 | Maugard | 248/124.1 X |
| 3,935,948 | * | 2/1976 | Podojil | 211/23 |
| 4,911,308 | * | 3/1990 | Nylumd | 211/175 X |
| 5,617,962 | * | 4/1997 | Chen | 211/206 |

FOREIGN PATENT DOCUMENTS

| 582635 | * | 9/1958 | (IT) | 211/20 |
|---|---|---|---|---|
| 659148 | * | 5/1965 | (IT) | 211/20 |

* cited by examiner

Primary Examiner—Blair M. Johnson
Assistant Examiner—Khoa Tran
(74) Attorney, Agent, or Firm—Jack C. Munro

(57) ABSTRACT

A rack for supporting athletic equipment and more particularly a rack for supporting a plurality of bicycles in a vertically suspended manner. The rack comprises a polygonal shaped base which has a diagonal dimension of greater length than the dimension of the sides of the base. A polygonal shaped standard is mounted onto the base with at least two of the planar sides being oriented perpendicular to the diagonal dimension of the base. Connected to the upper end of the standard is a crossbar with this crossbar extending in a direction substantially parallel to the diagonal dimension. The crossbar is to be inserted through the spoked gap are of a front wheel of a bicycle with the bicycle then being supported on the crossbar in a suspending manner. The base is to be mounted onto a wheel assembly facilitating low frictional movement of the rack on a supporting surface.

12 Claims, 3 Drawing Sheets

US 6,182,836 B1

MOVABLE BICYCLE STORAGE RACK

REFERENCE TO PRIOR APPLICATION

This application is a continuation-in-part of patent application Ser. No. 09/116,324, filed Jul. 15, 1998, by the same title and by the same author, now abandoned.

BACKGROUND OF THE INVENTION

1) Field of the Invention

The present invention relates to a free standing rack for storagely mounting of a bicycle in a vertically suspended manner above a supporting surface.

2) Description of the Prior Art

A substantial number of different types of bicycle storage racks have been devised in the past for the purpose of storing bicycles when such are not in use. The most conventional bicycle storage racks are wall or ceiling mounted devices which are permanently secured in place within a building structure. Conventional bicycle storage racks that are designed for home use must be bolted or otherwise secured to a wall or otherwise held against some supporting structure. As a consequence, defacement of the wall is necessary in order to install such a supporting rack and such racks become permanent fixtures. Such permanent mounting of racks frequently result in the bicycle being supported in a manner that it can be either difficult to get to to place the bicycle in a storage position in conjunction with a rack or difficult to remove the bicycle from the rack when it is desired to use the bicycle. Also, such permanent installed storage racks can locate the bicycle in a manner to cause interference with human movement or movement of other devices such as an automobile.

SUMMARY OF THE INVENTION

One of the primary objectives of the present invention is to construct a storage rack for bicycles which can be disassembled facilitating transportability of the rack and also storage of the rack when not in use.

Another objective of the present invention is to construct a bicycle storage rack which will permit the rack to be readily moved from location to location while it is being used permitting the storage rack to be moved away from a particular location in order to gain access to that particular location, and also permitting a storage rack to be moved to avoid interference with human movement or a separate device such as an automobile.

Another objective of the present invention is to construct a bicycle storage rack which facilitates mounting of as many as six bicycles in a compact supporting arrangement on the rack with the mounting of the bicycles to be easily accomplished even by individuals of weak strength and also where the rack can then be easily moved when supporting the bicycles from one location to another again by individuals with weak strength, such as women or children.

The bicycle storage rack of the present invention is constructed of a base with the base being of a polygonal shaped configuration having a diagonal dimension which is greater in length than the length of any side of the base. A lower end of an upright standard is removably engaged with the base with the upper end of the upright standard having mounted thereto a crossbar. The crossbar is oriented parallel to the diagonal dimension of the base so the weight of bicycles suspendingly mounted on the crossbar is cantilevered along the direction of the diagonal dimension to thereby distribute the supporting weight along the longest dimension of the base diminishing the possibility of tipping over of the rack during usage. The base includes a pair of support braces which connect between an upstanding centrally mounted support tube and the peripheral edge of the base. These support braces are to also function as a separator to laterally space apart on opposite sides of the support brace the rear wheels of two bicycles that are supportingly mounted on the portion of the crossbars which is in a alignment with the particular support brace.

DETAILED DESCRIPTION OF THE PREFERRED EMBODIMENT

Figure 1:
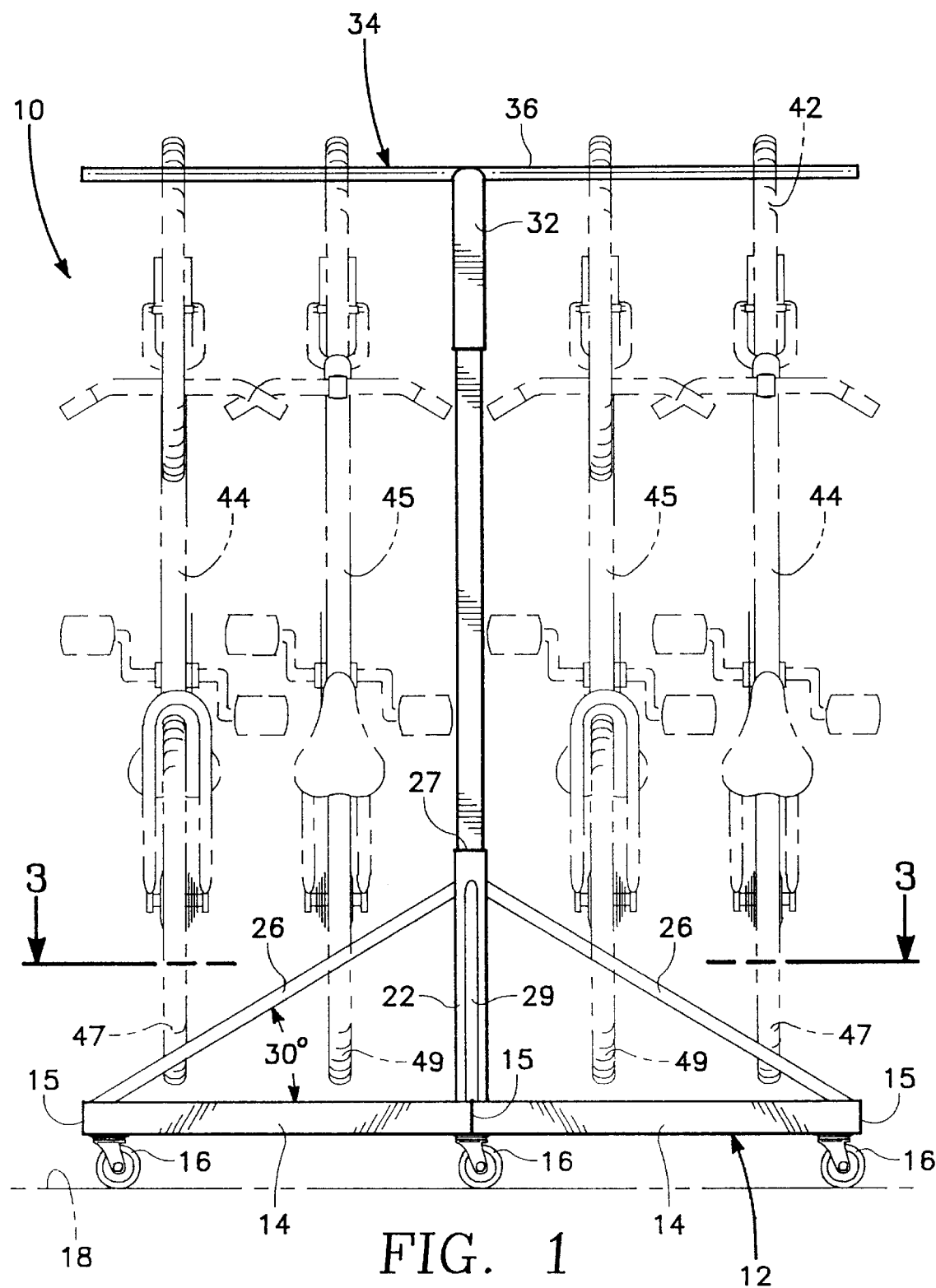
FIG. 1 is a front elevational view of the bicycle storage rack of the present invention showing the bicycle storage rack being used to support four in number of bicycles.

Referring particularly to the drawings, there is shown the bicycle storage rack 10 of this invention. The rack 10 includes a base 12. The base 12 is formed of a plurality (four in number) of welded or otherwise securely interconnected, end to end, linear members 14. The members 14 will generally comprise metallic tubes or angle iron. The members 14 are shown to be all of the same length with the interconnection of the members 14 defining a square. However, it is within the scope of this invention that other polygonal configurations could be utilized.

The connected together arrangement of the members 14 form four in number of corners 15 along the peripheral edge of the base 12 and mounted to the undersurface of each corner 15 is a caster wheel 16. The caster wheels 16 (four in number) are to facilitate movement of the rack 10 on a supporting surface 18. The base 12 also includes a cross brace 20 that is mounted across the center of the base 12 extending from one side 14 to an opposite side 14. Centrally mounted on the cross brace 20 is a support tube 22. The support tube 22 is a polygonal shape with actually a square shape being preferred. Planar surfaces of two of the opposite sides of the support tube 22 are located perpendicular to the diagonal dimension 24 of the base 12. It is to be understood that the opposite two side surfaces of the support tube 22 are also located perpendicular to the remaining diagonal dimension 25 of the base 12. The normal length of the support tube 22 will normally be within six to twelve inches in length.

The upper end of the support tube 22 is fixedly mounted in position by means of support braces 26 and 29 which are all of the same length. Each of the support braces 26 and 29 connect from a corner 15 and then are securely connected to the support tube 22 directly adjacent its upper free end 27. Support braces 26 are in alignment while each support brace being located on opposite sides of the support tube 22. Support braces 29 are also in alignment while each support brace 29 being located on opposite sides of the support tube 22. Support braces 26 are oriented perpendicular to support braces 29. Normally, the support braces 26 and 29 will comprise metallic rods. It is to be noted that the support braces 26 and 29 extend at approximately a thirty degree angle from a corner 15 to the upper free end 27 of the support tube 22.

The support tube 22 has an internal, longitudinal chamber 28. Located within the longitudinal chamber 28 is a lower end of a polygonal-shaped standard 30. The standard 30 will normally be located within the chamber 28 in a telescoping close fit relationship. When it is desired to collapse the rack 10 of this invention, it is necessary to remove the standard 30 from the chamber 28.

The upper end of the standard 30 is telescopingly mounted within a leg member 32 of a T-support 34. The T-support 34 includes a crossbar 36 which is fixedly secured as by welding to the leg member 32. Equal lengths of the crossbar 36 extend from opposite sides of the leg member 32. It is preferred that the crossbar 36 have a rounded upper surface to minimize marring of the wheel rim of the bicycles. The crossbar 36 is elongated and has an elongated dimension. The crossbar 36 may be coated with a resilient material such as a rubber or plastic. A normal material of construction of the crossbar 36 would generally be aluminum or steel. When collapsing of the rack 10 of this invention, the leg member 32 and crossbar 36 is to be separated from the upper end of the standard 30.

Figure 2:
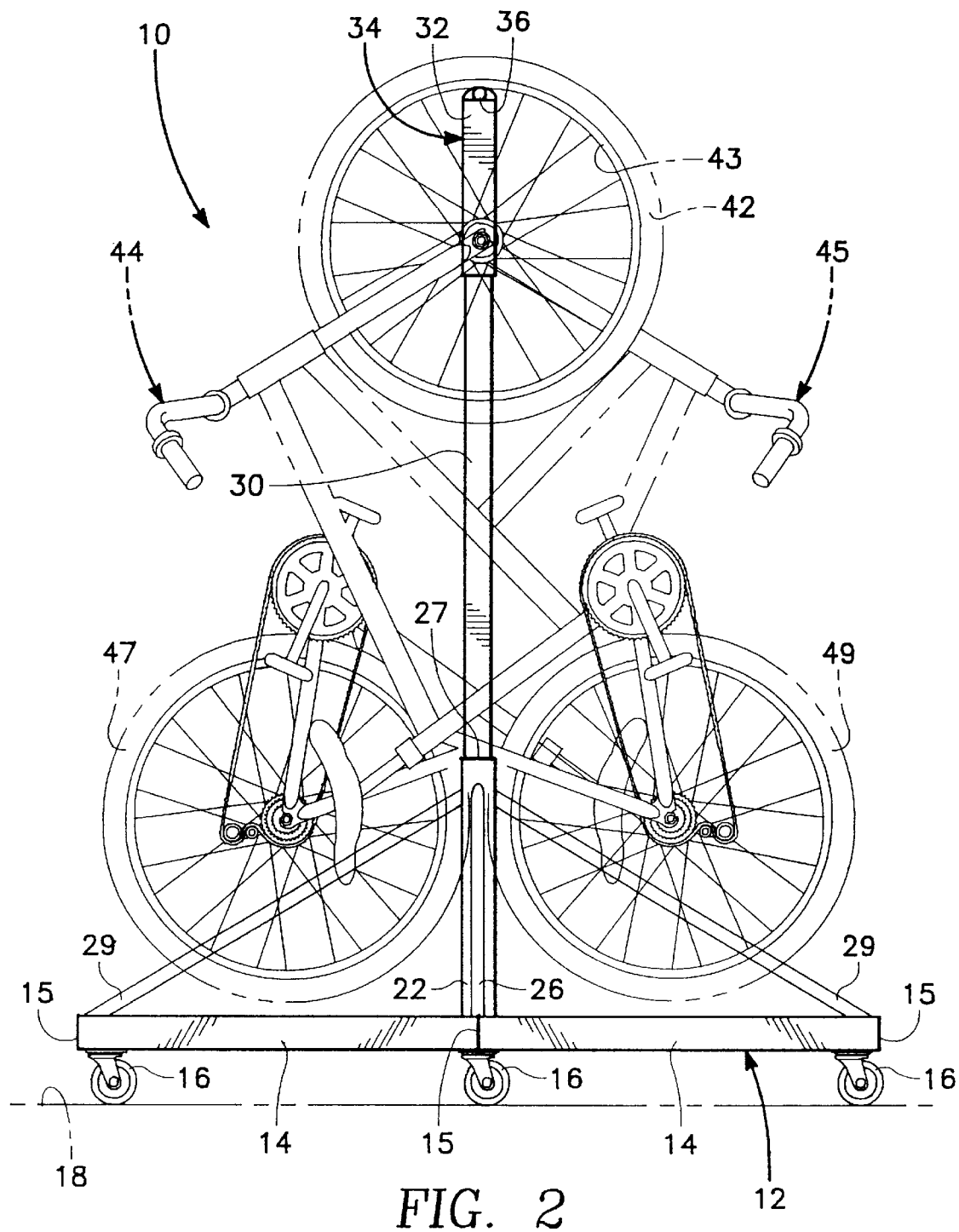
FIG. 2 is a side elevational view of the bicycle storage rack of the present invention showing the position of the bicycles that are supported on the storage rack.
Figure 3:
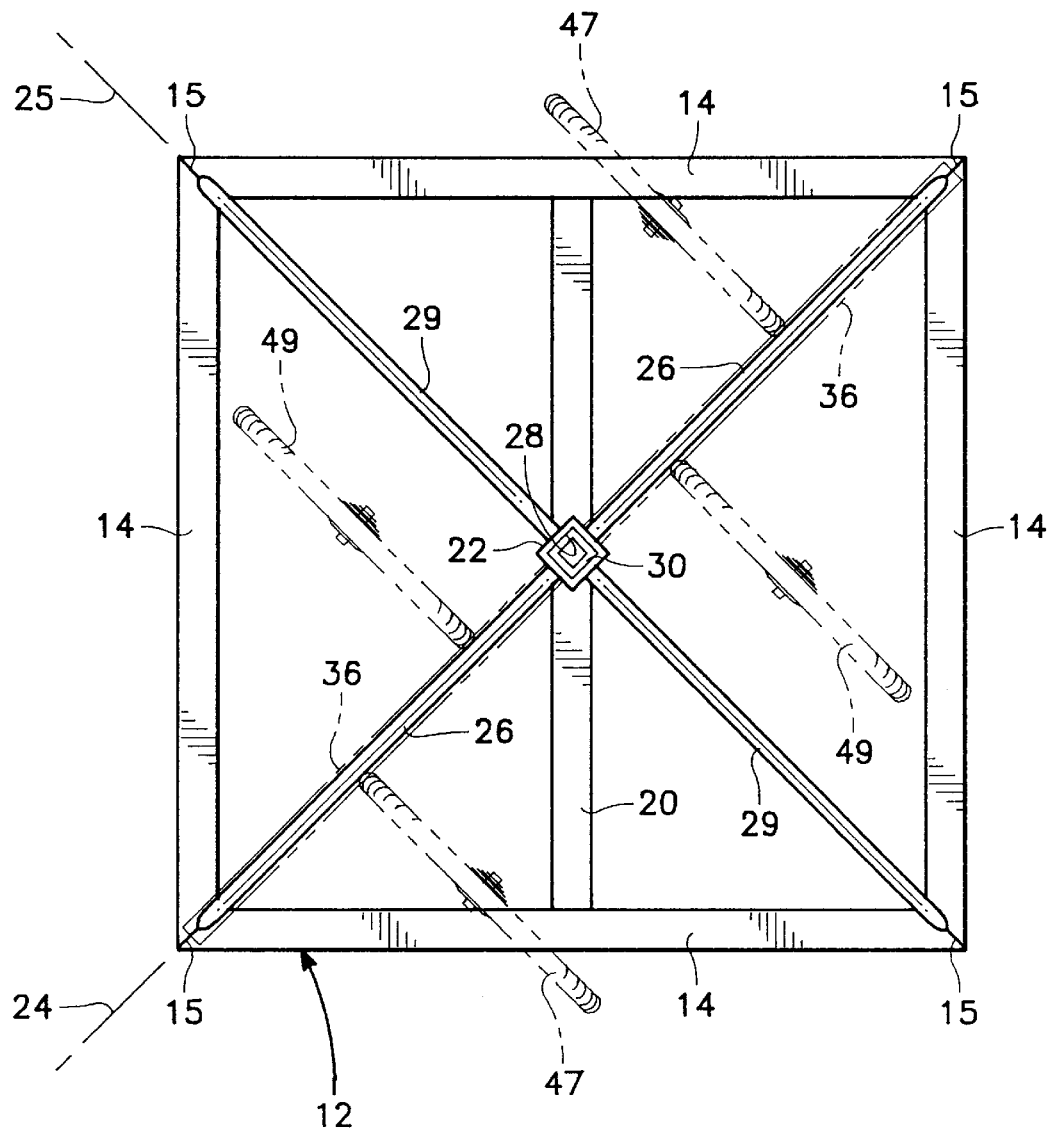
FIG. 3 is a top plan view of the base of the bicycle storage rack of the present invention taken along line 3—3 of FIG. 1.

In referring particularly to FIGS. 2 and 3, it can be seen that the longitudinal dimension of the crossbar 36 aligns with the diagonal dimension 24. Although this view is of the base 12, the position of the crossbar 36 is shown in phantom in relation to the base 12. The crossbar 36 is to be located through the spoked front wheel 42 of bicycles 44 and 45 with the resilient material covering the crossbar preventing marring of the rim 43 of the front wheel 42. It is to be noted that there are two in number of the bicycles, the outer bicycle 44 and the inner bicycle 45, mounted on one end of the crossbar 36 with two in number of similar such bicycles being mounted on the opposite end of the crossbar 36. In actual practice, each end of the crossbar 38 can be utilized to support three in number of the bicycles. The bicycles 44 and 45 are located in a vertically suspended manner. It is to be understood that directly adjacent bicycles 44 and 45 will be reversed so the pedals and handlebars will not interfere with one another thereby using less space. The bicycles 44 and 45 do not hang precisely vertical but slightly askew which provide for the close accommodation between directly adjacent bicycles 44 and 45. The weight of the bicycles 44 and 45 is distributed generally along the diagonal dimension 24 which provides increased stability and lessens the chance of tipping over of the rack 10 during usage. If the sidewalls of the support tube 22 were located parallel to the lineal members 14, the weight distribution of the bicycles 44 and 45 would be along the distance between oppositely oriented linear members 14 which is a shorter distance than the diagonal dimension 24. In actual practice, if the linear members 14 are about thirty inches in length, the diagonal dimension 24 will be about forty-two inches. The rear wheel 47 of bicycle 44 is to rest against one side of support brace 26 with the rear wheel 49 of bicycle 45 resting against the opposite side of support brace 26. In essence, each support brace 26 functions as a stop to position the bicycles 44 and 45 in their askewed position in suspension with crossbar 36. Actually, the center of gravity of each bicycle 44 and 45 is such that the bicycles 44 and 45 tend to hang naturally askewed. However, the support braces 26 insure that the askewed position is maintained which is to evenly distribute the weight of the bicycles 44 and 45 when suspended on the crossbar 36 thereby balancing of the rack 10.

What is claimed is:

1. A bicycle storage rack for storing a bicycle comprising:

a four sided base constructed of a plurality of sides with each said side having a length, said base having four spaced apart corners, said base having a diagonal dimension which is greater than each said length, a pair of thin elongated support braces attached to said base, each said support brace mounted to said base at a said corner, a support tube centrally attached to said base and extending therefrom, each said support brace assuming an angled position relative to said support tube and said base extending from its respective said corner to a point of attachment secured to said support tube with said support braces being in alignment with each other, each said point of attachment being spaced from said base;

a polygonal shaped upright standard having an upper end and a lower end, said lower end connecting with said support tube, said polygonal shaped standard having planar sides, a pair of said planar sides being oriented perpendicular to said diagonal dimension; and a single elongated crossbar having a longitudinal dimension mounted on said standard at said upper end, said longitudinal dimension of said crossbar being in alignment with said diagonal dimension and in alignment with said support braces, said crossbar having free ends extending from said standard, said crossbar to be inserted through a front spoked wheel of said bicycle thereby supporting the bicycle in a suspended manner with the cantilevered weight of the bicycle being distributed along said diagonal dimension diminishing the possibility of tipping over of said rack with a rear wheel of the bicycle to be in resting contact with a support brace thereby said support brace functioning as a stop to insure that the bicycle does not hang precisely vertical but assumes a slightly askewed position relative to said crossbar.

2. The bicycle storage rack as defined in claim 1 wherein:

said standard being slidably mounted on said support tube, said standard being disengageable from said support tube achieving collapsing of said rack for purposes of transportability.

3. The bicycle storage rack as defined in claim 2 wherein:

said crossbar being slidably mounted relative to said standard, said crossbar being disengageable from said standard achieving collapsibility for reason of transporting of said rack.

4. The bicycle storage rack as defined in claim 1 wherein:

said standard being four sided.

5. The bicycle storage rack as defined in claim 1 wherein:

said base being of a square configuration.

6. The bicycle storage rack as defined in claim 1 wherein:

said base being mounted on a wheel assembly, said wheel assembly facilitating low frictional movement of said rack on a supporting surface.

7. In combination with a pair of bicycles, a bicycle storage rack for storing said bicycles comprising:

a four-sided base constructed of a plurality of sides with each said side having a length, said base having four spaced apart corners, said base having a diagonal dimension which is greater than each said length, a pair of thin elongated support braces attached to said base, a support tube centrally attached to said base and extending therefrom, each said support brace assuming an angled position relative to said support tube and said base extending from its respective said corner to a point of attachment secured to said support tube with said support braces being in alignment with each other, each said point of attachment being spaced from said base;

a polygonal shaped upright standard having an upper end and a lower end, said lower end connecting with said support tube, said polygonal shaped standard having planar sides, a pair of said planar sides being oriented perpendicular to said diagonal dimension;

a single elongated crossbar having a longitudinal dimension mounted on said standard at said upper end, said longitudinal dimension of said crossbar being in alignment with said diagonal dimension and in alignment with said support braces, said crossbar having free ends extending from said standard, said crossbar is inserted through a front spoke wheel of each of said bicycles for supporting the bicycles in abutting juxtaposition in a suspended manner with the cantilevered weight of the bicycles being distributed along said diagonal dimension diminishing the possibility of tipping over of said rack with a rear wheel of each of the bicycles being in resting contact with a support brace, thereby said support brace functions as a stop to insure that each bicycle does not hang precisely vertical but assumes a slightly askewed position relative to said crossbar; and said pair of bicycles being mounted on one said free end of said crossbar in a reversed arrangement permitting said pair of bicycles to be closely located with parts of said bicycles overlapping without interference thereby having said bicycles occupy a minimum amount of space when suspended on said crossbar, said rear wheels of said bicycles contacting said support brace on opposite sides thereof.

8. The combination as defined in claim 7 wherein:

said standard being slidingly mounted on said support tube, said standard being disengageable from said support tube achieving collapsing of said rack for purposes of transportability.

9. The combination as defined in claim 8 wherein:

said crossbar being slidably mounted relative to said standard, said crossbar being disengageable from said standard achieving collapsibility for reason of transporting of said rack.

10. The combination as defined in claim 7 wherein:

said standard being four sided.

11. The combination as defined in claim 7 wherein:

said base being of a square configuration.

12. The combination as defined in claim 7 wherein:

said base being mounted on a wheel assembly, said wheel assembly facilitating low frictional movement of said rack on a supporting surface.

* * * * *